(No Model.) 3 Sheets—Sheet 1.

C. W. MacCORD.
LATHE FOR TURNING ELLIPTICAL FORMS.

No. 531,203. Patented Dec. 18, 1894.

Witnesses:
O. Lundgren
George Barry

Inventor
Charles W. MacCord
by attorneys
Brown & Seward (No Model.)  3 Sheets—Sheet 2.

C. W. MacCORD.
LATHE FOR TURNING ELLIPTICAL FORMS.

No. 531,203. Patented Dec. 18, 1894.

Witnesses
O. Sundgren
George Barry.

Inventor:
Charles W. MacCord
by attorneys
Brown & Seward (No Model.)　　　　　　　C. W. MacCORD.　　　　3 Sheets—Sheet 3.
LATHE FOR TURNING ELLIPTICAL FORMS.

No. 531,203.　　　　　　　　　Patented Dec. 18, 1894.

Witnesses:
C. J. Sundgren
George Barry

Inventor:
Charles W. MacCord
by attorneys
Brown & Seward

UNITED STATES PATENT OFFICE.

CHARLES W. MacCORD, OF HOBOKEN, NEW JERSEY, ASSIGNOR TO THE PRATT & WHITNEY COMPANY, OF HARTFORD, CONNECTICUT.

LATHE FOR TURNING ELLIPTICAL FORMS.

SPECIFICATION forming part of Letters Patent No. 531,203, dated December 18, 1894.

Application filed March 29, 1894. Serial No. 505,544. (No model.)

*To all whom it may concern:*

Be it known that I, CHARLES W. MACCORD, of Hoboken, in the county of Hudson and State of New Jersey, have invented a new and useful Improvement in Lathes for Turning Elliptical Forms, of which the following is a specification.

My invention relates to an improvement in lathes for turning elliptical forms, in which provision is made for setting the parts at pleasure to turn ellipses having any given ratio, within the compass of the machine, between their major and minor axes.

A practical embodiment of my invention is represented in the accompanying drawings, in which—

Figure 1:
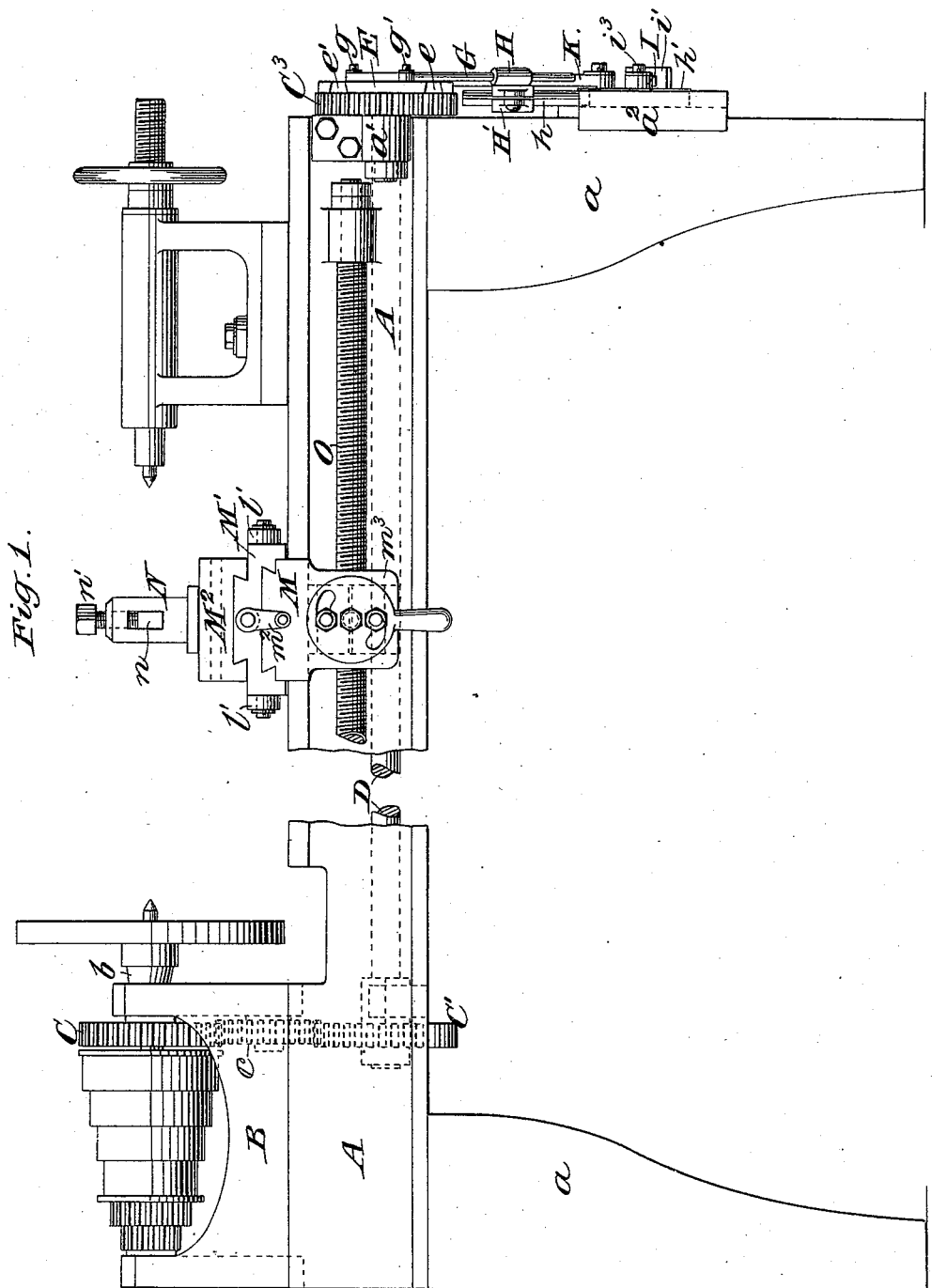
Figure 3:
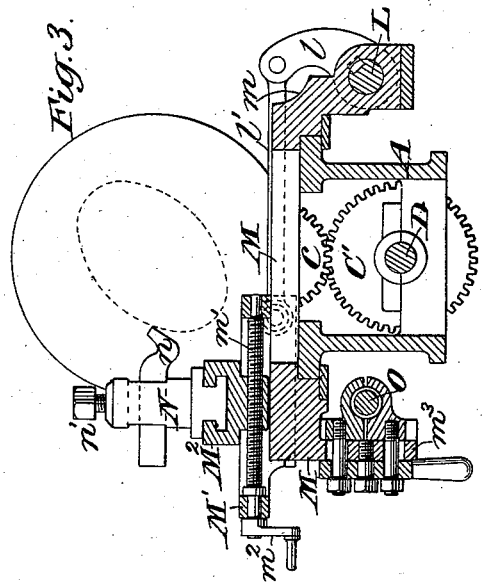
Figure 4:
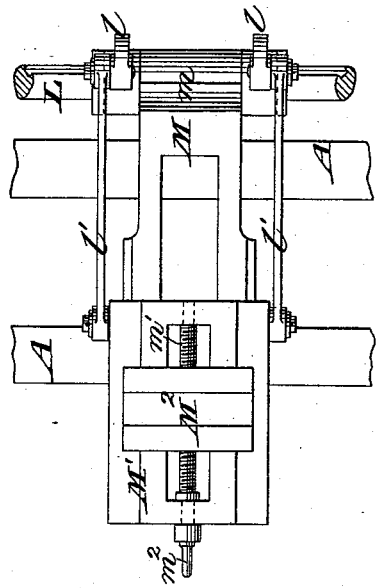
Figure 2:
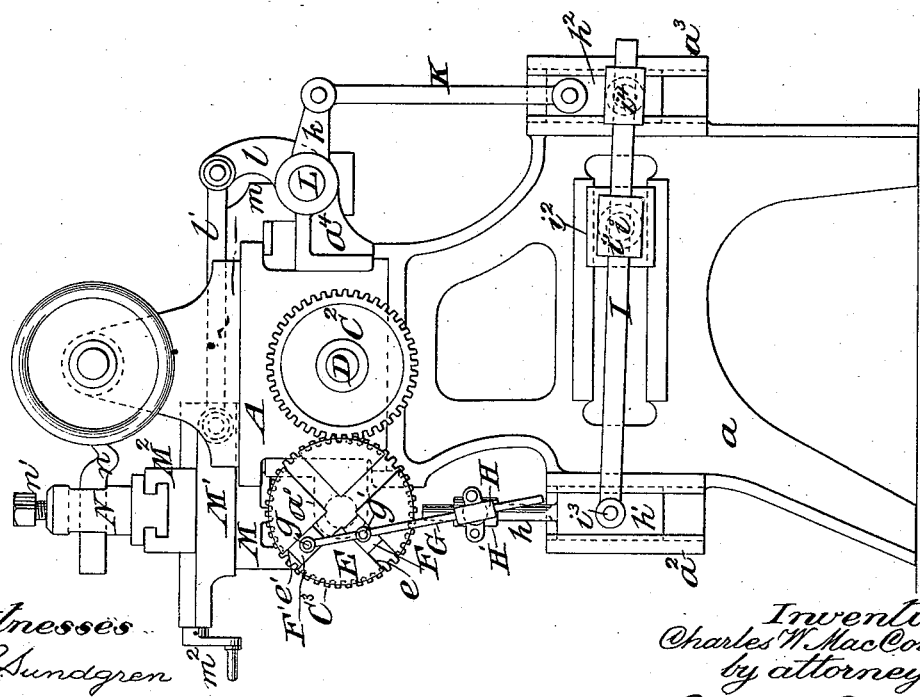
Figure 8:
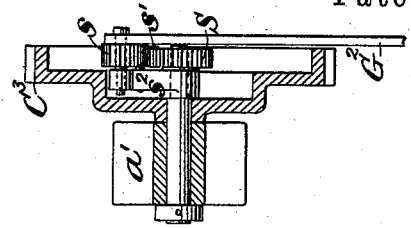
Figure 7:
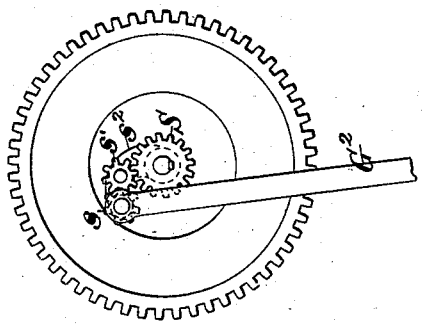
Figure 6:
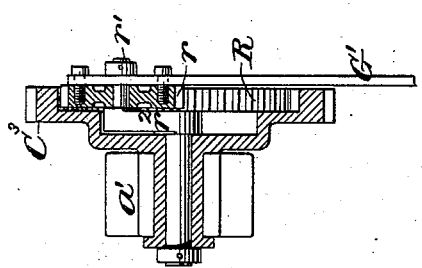
Figure 5:
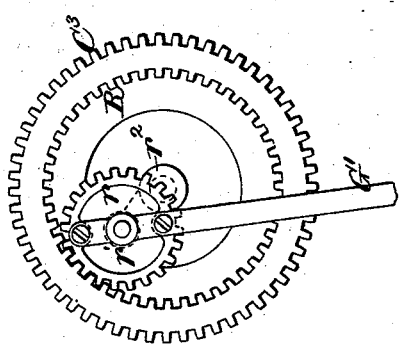

Figure 1 represents a view of a lathe embodying my invention, in side elevation. Fig. 2 is a view of the foot end of the lathe, in elevation. Fig. 3 is a transverse section through the bed and sliding rest, looking toward the head stock. Fig. 4 is a top plan view of the slide rest, its carriage and their operating mechanism, the tool post being removed. Figs. 5 and 6 represent, respectively, in face elevation and transverse section, a modified form of elliptographic trammel; and Figs. 7 and 8 represent similar views of still another form of the elliptographic trammel.

A represents the bed of the lathe, shown in the present instance as supported upon legs or pedestals $a$.

B represents the head stock of the lathe in which is mounted the mandrel $b$, provided with the usual band pulleys and having fixed thereon a toothed wheel C in gear with an idle wheel $c$, the latter in gear with a wheel C', equal to the wheel C, the wheel C' being fixed to rotate with a shaft D extending along the bed of the lathe and provided at the foot end of the lathe with a toothed wheel $C^2$, equal to the wheel C', and geared with an equal toothed wheel $C^3$, mounted to rotate freely in suitable bearings in a bracket $a'$, fixed to the bed A.

A disk E is fixed to rotate with the wheel $C^3$, being in the present instance applied to the face of the wheel $C^3$, the disk E being provided in its face with grooves $e$ and $e'$ extending diametrically across the face of the disk at right angles to each other. In the grooves $e$ and $e'$ blocks F and F' are arranged to slide, the former in the groove $e$ and the latter in the groove $e'$. The blocks F and F' are pivoted to a bar G at points $g$, $g'$ and the bar G is provided with a socket piece H which may be adjusted at different distances from the end of the bar by any well known or approved means. The socket piece H is pivoted to a second socket piece H' which latter is provided with any well known or approved means for holding it in different adjustments along the rod or bar $h$, fixed to a vertically sliding piece $h'$ held in a suitable groove formed in a projection $a^2$ either fixed to or formed integral with a pedestal of the lathe.

A vibrating lever I is fulcrumed at $i$ in a socket piece $i'$ pivotally secured to a horizontally sliding block $i^2$ held in a suitable groove formed therein in the pedestal of the lathe. One end of the lever I is pivotally secured at $i^3$ to the sliding piece $h'$ and the opposite end is secured in a socket piece $i^4$, pivoted to a vertically sliding piece $h^2$ held in a suitable groove formed therefor in a projection $a^3$, fixed to or formed integral with the pedestal of the lathe. Any well known or approved means may be employed for locking the horizontally sliding block $i^2$ in its adjusted position along its horizontal groove.

The vertically sliding piece $h^2$ is connected by a rod K with an arm $k$ fixed on a rock shaft L, extending longitudinally along the lathe and mounted in suitable bearings in brackets $a^4$ attached to the lathe bed. The rock shaft L extends through a downward projection $m$ on the bed M of the sliding rest, so that the slide rest is permitted to move freely along the bed of the lathe without hinderance from the shaft L. The bed M of the slide rest is surmounted by a carriage M' mounted on the slide transversely across the lathe bed and said carriage M' is connected by a pair of rods $l'$ with a pair of arms $l$ mounted on the rock shaft L so as to rock with the rocking of the shaft and at the same time be free to slide longitudinally along the shaft L with the slide rest. The connection of the arms $l$ with the rock shaft L may be of the ordinary feather and groove type. The working length of the arms $l$ is equal to the working length of the arm $k$ and the centers of their connections with the rods $l'$ and K are in planes at right angles to each other at the axis of the rock shaft L. The working lengths of the connecting rods $l'$ and K are also made equal to each other.

The transversely sliding carriage M' is surmounted by another carriage $M^2$, arranged to slide transversely of the lathe bed and operated by a screw $m'$ mounted in the carriage M' and provided with an operating crank $m^2$. The tool post N is secured in the carriage $M^2$, in the present instance in such a manner that it may be adjusted to a limited extent lengthwise of the lathe bed and the cutting tool $n$ is held in the post by a set screw $n'$. The slide rest M is further provided with a depending attachment $m^3$ for engaging it with a feed screw O in the usual manner.

The disk E with its grooves $e$ and $e'$, sliding blocks F and F', bar G and the guide for keeping the movement of the connection H of the bar G in a right line is an application of one form of the well known elliptographic trammel and the length of the movement of the connection H in a right line will be equal to the distance between the points $g$ and $g'$ where the bar G is connected with the sliding blocks and will also be equal to the difference between the semi axes of the ellipses, described by a point or marker held at H, and operating upon the face of a disk centered with and moving at the same rate as the disk E.

By means of the connections which have hereinbefore been described, it follows that the disk E is driven at the same rate of speed that the mandrel $b$ is driven so that, if the tool be made to move toward and away from the piece of work centered in the axis of the mandrel $b$ and the motion of the tool be made to depend upon the motion of the connection H, under the impulse of the sliding blocks, operated by the rotary movement of the disk E, the point of the tool so held and moved will describe an ellipse and hence will serve to turn the piece of work to an elliptical form in cross section.

If the lever I be fulcrumed at its center, the difference between the semi-axes of the ellipse will be equal to the difference between the pivotal connections $g$ and $g'$ of the bar G, with the sliding blocks. The difference between the semi-axes of the elliptical form to be turned may, however, be made to vary to suit the desired form by moving the fulcrum of the lever I either toward or away from the vertically sliding piece $h'$ so as to increase or decrease the movement of the sliding piece $h^2$ under a given movement of the piece $h'$ and in general the adjustments may be effected as follows:

Let $p$ represent the semi-major axis of any required elliptical form and let $q$ represent the semi-minor axis of said elliptical form. Then by moving the disk E until the point $g$ is in its lowermost position, the position of the major axis of the piece of work in the lathe will be horizontal and the bar G will be vertical. Now, loosen the socket pieces H and H' from their bars or rods G $h$ and move them up or down until the distance H $g$ bears the same ratio to H $g'$ as $p$ bears to $q$. The clamp screws being then advanced the adjustment of eccentricity is complete. The vertical traverse of the piece $h'$ is, however, always equal to the distance between $g$ and $g'$; whereas the horizontal traverse of the tool must be equal to $p-q$. Therefore the block $i^2$ must be moved until the horizontal distance between the slides $h'$ and $h^2$ is divided in such a proportion that the distance between $i^3$ and $i$ bears the same ratio to the distance between $i$ and $i^4$ that the distance between $g$ and $g'$ bears to $p-q$. This completes the adjustment for dimensions. The carriage M' being now at the extreme left of its stroke, it remains to set the point of the tool at a distance $p$ from the axis of the lathe. This is done by means of a hand operated screw $m'$ operating upon the carriage $M^2$. It is advisable to have a stop of any well known or approved form, not shown herein, which may be adjusted in position to prevent the carriage $M^2$ from being fed any farther toward the axis of the piece of work than that point where the point of the tool is a distance $p$ from the axis of the lathe. The carriage may, however, be moved farther away for taking the roughening cuts. While taking those, the piece of work would be turned to a symmetrical but not to a truly elliptical section. This will be gradually approached as the tool is fed in by the hand operated screw $m'$ and the exact form will be attained when the carriage $M^2$ is arrested by the stop at the point hereinabove named. After the tool reaches this point, the turning of the piece of work may be completed by the automatic movement of the carriage M', under the control of the disk E through intermediate connections.

By the above means, the work to be operated upon may be centered and driven as in a common lathe, its only motion being that of rotation on its axis of symmetry, the elliptic form being produced by an automatic transverse reciprocating motion of the cutting tool, thereby doing away with the objections which pertain to the mounting of the work away from center, and the consequent bodily movement of it through space with respect to the axial line of rotation of its driving mechanism.

I find it desirable to so mount the idle wheel $c$ that it may be thrown out of gear at pleasure in any well known or approved manner as by this simple expedient the elliptical devices become inoperative and the lathe may be used like any other for ordinary circular work.

Instead of making the fulcrum of the lever I adjustable with respect to the lever, it might be made stationary and the connections of the bar G with the sliding blocks and socket piece H be made adjustable after the manner of the common elliptographic trammel bar and both eccentricity and dimensions may be thereby secured. It is also obvious that the disk E and its driving wheel $C^3$ might be located in other positions than those specifically shown with respect to the working parts of the lathe, such changes being considerd by me mere modifications of practical detail without involving any change in the fundamental principle of the mechanism previously described.

Instead of using the disk and sliding blocks to produce the required motion, I may use the form shown in Figs. 5 and 6. In this form a rolling pinion $r$ is geared with an internal annular gear R, the latter having twice the number of teeth that the pinion has. In the present instance the pinion has twenty-two teeth and the internal gear forty-four. The trammel bar $G'$ is fixed to the side of the pinion which in this case, in order to keep it in gear with the wheel, is mounted upon the pin $r'$ of the crank $r^2$ having its axis of rotation in alignment with the axis of rotation of the gear R.

Figs. 7 and 8 represent another form of elliptographic trammel. As in Figs. 5 and 6, the trammel bar $G^2$ is connected with a pinion $s$ operated by a wheel S of twice the number of teeth, gearing with an intermediate idle wheel $s'$. The essential difference between this form and that shown in Figs. 5 and 6 is in the location of the pinion with respect to the wheel which operates it; Figs. 5 and 6 showing an internal engagement while Figs. 7 and and 8 show an external engagement. In the latter form, the pinions $s$ and $s'$ are mounted loosely upon pins fixed in the arm $s^2$ which turns freely upon the shaft to which the wheel S is keyed. In both of these cases the trammel bar will move essentially in the same manner as in the form first described, notwithstanding their dissimilarity in appearance, and are held by me to be mechanical equivalents for the purposes of operating the trammel bar to impart to the cutting tool the necessary movements.

In view of the various means for imparting the necessary rectilinear motion for operating the cutting tool to trace an ellipse, I wish to be understood as not confining myself, in my present invention, to any special mechanism for such purpose.

What I claim is—

1. In combination, a lathe in which the cutting tool is supported to move toward and away from the piece to be operated upon, an elliptographic trammel, connections for turning the wheel or disk of the trammel at the same speed with the lathe mandrel, means for converting the movement of one point of the trammel bar into a reciprocating rectilinear movement and connections for transmitting the said reciprocating rectilinear motion to the cutting tool of the lathe, substantially as set forth.

2. In combination, a lathe in which the cutting tool is supported to move toward and away from the work, an elliptographic trammel, connections for driving the wheel or disk of the trammel at the same speed with the lathe mandrel, means for causing one point of the trammel bar to move in a reciprocating rectilinear path, connections for imparting said reciprocating rectilinear movement to the cutting tool, and adjusting devices for increasing or diminishing the lengths of the movements of the tool relatively to the length of movement of the rectilinear moving point on the trammel bar, substantially as set forth.

3. The combination with the work holding mechanism of a turning lathe, and a slide arranged to move along the lathe bed, of a transversely movable carriage supported upon the slide rest, a second transversely movable carriage surmounting the first named carriage, a tool holder carried by said second carriage, means for adjusting the tool carrying carriage relatively to the first named carriage, an elliptographical trammel actuated by the lathe mandrel and connections between the trammel bar and the first named carriage for imparting to it its transverse movement, substantially as set forth.

4. The combination with a lathe provided with a transversely movable tool-operating carriage, of an elliptographic trammel, a slide connected with the trammel bar and arranged to move in a right line, a second slide connected with the said transversely movable carriage and arranged to move in a right line, a lever connecting the two slides and provided with an adjustable fulcrum, and means for operating the elliptographic trammel, substantially as set forth.

CHARLES W. MacCORD.

Witnesses:
 FREDK. HAYNES,
 GEORGE BARRY.